US012603066B2

(12) United States Patent
Lin et al.

(10) Patent No.: US 12,603,066 B2
(45) Date of Patent: Apr. 14, 2026

(54) DISPLAY DEVICE AND CONTROL METHOD THEREFOR

(71) Applicant: AUO Corporation, Hsinchu City (TW)

(72) Inventors: Syuan-Ying Lin, Hsinchu City (TW); Cheng-Kuang Wang, Hsinchu City (TW); Min-Hsuan Chiu, Hsinchu City (TW); Wei-Ming Cheng, Hsinchu City (TW); Sung-Yu Su, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 0 days.

(21) Appl. No.: 18/931,129

(22) Filed: Oct. 30, 2024

(65) Prior Publication Data

US 2025/0292744 A1 Sep. 18, 2025

(30) Foreign Application Priority Data

Mar. 14, 2024 (TW) ................................ 113109512

(51) Int. Cl.
*G09G 3/32* (2016.01)
*G09G 5/02* (2006.01)

(52) U.S. Cl.
CPC ................ *G09G 5/02* (2013.01); *G09G 3/32* (2013.01); *G09G 2310/0235* (2013.01); *G09G 2320/0242* (2013.01)

(58) Field of Classification Search
CPC ............ G09G 3/32–3291; G09G 5/02; G09G 2300/0421–043; G09G 2300/0439; G09G 2300/0443; G09G 2300/0452; G09G 2300/0809; G09G 2300/0814–0823; G09G 2300/0842; G09G 2300/0861; G09G 2310/02; G09G 2310/0202; G09G 2310/0209; G09G 2310/0213; G09G 2310/0216; G09G 2310/0218; G09G 2310/0224; G09G 2310/0227; G09G 2310/0235; G09G 2310/0243; G09G 2310/0262; G09G 2310/04;
(Continued)

(56) References Cited

U.S. PATENT DOCUMENTS

2007/0103405 A1* 5/2007 Kwak .................. G09G 3/3291 345/76
2009/0059581 A1* 3/2009 Hayashi ............... G09G 3/3607 345/102
(Continued)

*Primary Examiner* — Nathan Danielsen
(74) *Attorney, Agent, or Firm* — WPAT, PC

(57) ABSTRACT

A display device and a control method therefor are provided. The display device includes a pixel row having first, second and third color sub-pixel blocks. In the control method, a frame is divided into a first sub-frame and a second sub-frame. Then, M color-mixed pixel blocks and N single color pixel blocks are defined. When N=0, the first and second sub-pixel blocks of at least one of the color-mixed pixel blocks are controlled to emit lights in the first sub-frame, and the first and the third sub-pixel blocks of the at least one of the color-mixed pixel blocks are controlled to emit lights in the second sub-frame. When N≠0, the first and second sub-pixel blocks of the color-mixed pixel blocks are controlled to emit lights in the first sub-frame, and third color sub-pixel blocks of the single color pixel blocks are controlled to emit lights in the second sub-frame.

12 Claims, 17 Drawing Sheets

(58) Field of Classification Search
CPC ........... G09G 2310/06; G09G 2310/08; G09G 2320/0233; G09G 2320/0242; G09G 2320/0257; G09G 2320/0261; G09G 2320/0266; G09G 2320/04
See application file for complete search history.

(56) References Cited

U.S. PATENT DOCUMENTS

2010/0238203 A1* 9/2010 Stroemer ............. G09G 3/3611 345/690
2016/0181337 A1* 6/2016 Gu ....................... G09G 3/3258 257/40
2020/0327843 A1* 10/2020 Ahmed .................... G09G 3/32

* cited by examiner

DISPLAY DEVICE AND CONTROL METHOD THEREFOR

CROSS-REFERENCE TO RELATED APPLICATION

This application claims priority to Taiwan Application Serial Number 113109512, filed Mar. 14, 2024, which is herein incorporated by reference in its entirety.

BACKGROUND

Field of Invention

The present invention relates to a display device and control method therefor. More particularly, the present invention relates to a field sequential emission display device and control method therefor.

Description of Related Art

In recent years, display devices play an important role in various electric products for providing high quality images to users. Transparent display devices become more popular because the transparent display devices can be blended into user's environment.

In general, the higher transmittance the transparent display device has, the better effect for see through the transparent display device has. The transmittance of the transparent display device is dependent upon transparent regions except for the transparent region on which light-emitting elements and circuits of the light-emitting elements are disposed (also referred to as "aperture ratio"). In order to increase the aperture ratio of the transparent display device, the transparent display device applies a driving method of Field Sequential Color (FSC) to decease the area of the circuit region. However, the conventional FSC display device has a problem of Color Break UP (CBU) affecting visual effects.

SUMMARY

Therefore, the present invention provides a display device and a control method therefor to solve the problem of CBU.

In accordance with embodiments of the present invention, the display device includes a first pixel row. The first pixel row includes a plurality of first pixel blocks. Each of the first pixel blocks includes: a first color sub-pixel block, a second color sub-pixel block and a third color sub-pixel block. The first color sub-pixel block is electrically connected to a first scan line, a second scan line and a first data line to obtain a first color data from the first data line in accordance with a signal of the first scan line. The second color sub-pixel block is electrically connected to a second scan line and a second data line to obtain a second color data from the second data line in accordance with a signal of the second scan line. The third color sub-pixel block is electrically connected to the first scan line and the second data line to obtain a third color data from the second data line in accordance with a signal of the first scan line. The first color sub-pixel block and the second color sub-pixel block correspond to a first sub-frame of a frame, and the first color sub-pixel block and the third color sub-pixel block correspond to a second sub-frame of the frame.

In some embodiments, the display device further includes a second pixel row disposed adjacent to the first pixel row. The second pixel row includes a plurality of second pixel blocks, and each of the second pixel blocks includes: a fourth color sub-pixel block, a fifth color sub-pixel block and a sixth color sub-pixel block. The fourth color sub-pixel block is electrically connected to a third scan line, a fourth scan line and the first data line to obtain a fourth color data from the first data line in accordance with a signal of the third scan line. The fifth color sub-pixel block is electrically connected to the fourth scan line and the second data line to obtain a sixth color data from the second data line in accordance with a signal of the fourth scan line. The sixth color sub-pixel block is electrically connected to the third scan line and the second data line to obtain a sixth color data from the second data line in accordance with a signal of the third scan line. The fourth color sub-pixel block and the fifth color sub-pixel block correspond to the first sub-frame of the frame, and the fourth color sub-pixel block and the sixth color sub-pixel block correspond to the second sub-frame of the frame.

In some embodiments, the first color sub-pixel block and the fourth color sub-pixel block correspond to a red color, the second color sub-pixel block and the fifth color sub-pixel block correspond to a green color, and the third color sub-pixel block and the sixth color sub-pixel block correspond to a blue color.

In some embodiments, the first color sub-pixel block is located between the first data line and the second data line.

In some embodiments, the fourth color sub-pixel block is located between the first data line and the second data line.

In accordance with embodiments of the present invention the display device includes a first pixel row. Each of the first pixel blocks comprises: a first color sub-pixel block, a second color sub-pixel block and a third color sub-pixel block. The first color sub-pixel block is electrically connected to a first scan line, and a first data line to obtain a first color data from the first data line in accordance with a signal of the first scan line. The second color sub-pixel block is electrically connected to the second scan line and a second data line to obtain a second color data from the second data line in accordance with a signal of the second scan line. The third color sub-pixel block is electrically connected to the first scan line and the second data line to obtain a third color data from the second data line in accordance with a signal of the first scan line. The first color sub-pixel block and the third color sub-pixel block of a first one of the first pixel blocks correspond to a first sub-frame of a frame, and the second color sub-pixel block of a second one of the first pixel blocks correspond to a second sub-frame of the frame, and the second one of the first pixel blocks is adjacent to the first one of the first pixel blocks.

In some embodiments, the display device further includes a second pixel row disposed adjacent to the first pixel row. The second pixel row comprises a plurality of second pixel blocks, and each of the second pixel blocks comprises: a fourth color sub-pixel block, a fifth color sub-pixel block and a sixth color sub-pixel block. The fourth color sub-pixel block is electrically connected to a third scan line and the first data line to obtain a fourth color data from the first data line in accordance with a signal of the third scan line. The fifth color sub-pixel block is electrically connected to a fourth scan line and the second data line to obtain a fifth color data from the second data line in accordance with a signal of the fourth scan line. The sixth color sub-pixel block is electrically connected to the third scan line and the second data line to obtain a sixth color data from the second data line in accordance with a signal of the third scan line. The fifth color sub-pixel block corresponds to the first sub-frame of the frame, and the fourth color sub-pixel block and the sixth color sub-pixel block correspond to the second sub-frame of the frame.

In some embodiments, the first color sub-pixel block and the fourth color sub-pixel block correspond to a red color, the second color sub-pixel block and the fifth color sub-pixel block correspond to a green color, and the third color sub-pixel block and the sixth color sub-pixel block correspond to a blue color.

In some embodiments, the first color sub-pixel block is located between the first data line and the second data line.

In some embodiments, the fourth color sub-pixel block is located between the first data line and the second data line.

In accordance with embodiments of the present invention, the control method includes: providing a first pixel row comprising a plurality of first pixel blocks, wherein each of the first pixel blocks includes: a first color sub-pixel block, a second color sub-pixel block and a third color sub-pixel block; dividing a frame into a first sub-frame and a second sub-frame; defining M first color mixed pixel blocks and N first single color pixel blocks in the first pixel blocks, wherein M is an integer greater than 1, and N is an integer greater or equal to 0; when N=0, performing a first pixel control step to control the first color sub-pixel block and the second color sub-pixel block of at least one of the first color mixed pixel blocks to emit light in the first sub-frame, and to control the first color sub-pixel block and the third color sub-pixel block of the at least one of the first color mixed pixel blocks to emit light in the second sub-frame; and when N≠0, performing a second pixel control step. The second pixel control step includes: controlling the first color sub-pixel block and the third color sub-pixel block of each of the first color mixed pixel blocks to emit light in the first sub-frame; and controlling the second color sub-pixel block of each of the single color pixel blocks to emit light in the first sub-frame.

In some embodiments, the first color sub-pixel block and the fourth color sub-pixel block correspond to a red color, the second color sub-pixel block and the fifth color sub-pixel block correspond to a green color, and the third color sub-pixel block and the sixth color sub-pixel block correspond to a blue color.

In some embodiments, when M and N are greater than or equal to 2, the first single color pixel blocks and the first color mixed pixel blocks are alternatively arranged; and when X and Y are greater than or equal to 2, the second single color pixel blocks and the second color mixed pixel blocks are alternatively arranged.

In some embodiments, providing the first pixel row comprises: disposing the first color sub-pixel block between the first data line and the second data line.

In some embodiments, providing the second pixel row comprises: disposing the fourth color sub-pixel block between the first data line and the second data line.

BRIEF DESCRIPTION OF THE DRAWINGS

The invention can be more fully understood by reading the following detailed description of the embodiment, with reference made to the accompanying drawings as follows.

Figure 1:
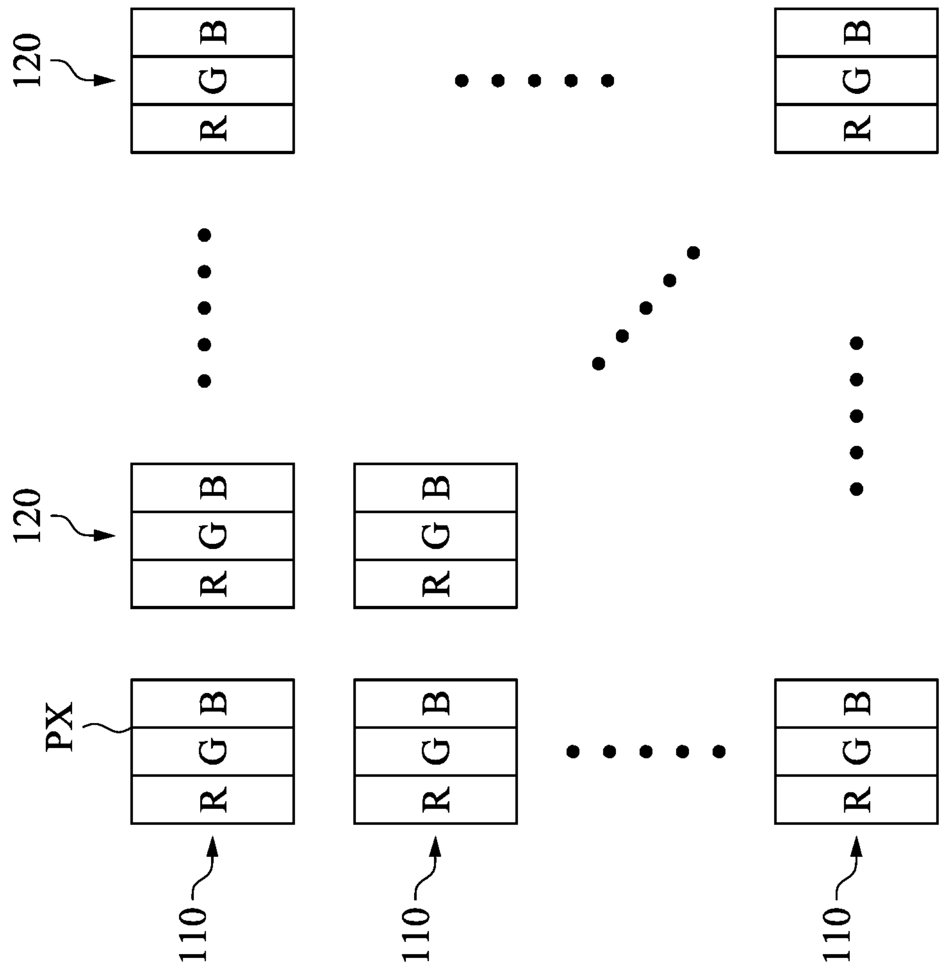
FIG. 1 is a schematic diagram showing arrangements of pixel bocks of a display device in accordance with embodiments of the present invention.

In accordance with customary practice, the various features and elements in the drawings are not drawn to scale, but are drawn in a manner that best represents the specific features and elements relevant to the present disclosure. Furthermore, among the different drawings, similar elements/components are referred to by the same or similar reference numerals.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology but are not referred to particular order or sequence.

Referring to FIG. 1, FIG. 1 is a schematic diagram showing arrangements of pixel bocks of a display device in accordance with embodiments of the present invention. As shown in FIG. 1, in the embodiments of the present invention, the display device includes plural pixel blocks PX, and the pixel blocks PX are arranged in a form of matrix. For example, the pixel blocks PX are arranged into plural pixel rows 110 and plural pixel columns 120. Each of the pixel blocks PX includes a first color sub-pixel block R, a second color sub-pixel block G and a third color sub-pixel block B.

The first color sub-pixel block R, the second color sub-pixel block G and the third color sub-pixel block B are configured to emit lights having different colors. In this embodiment, the first color sub-pixel block R corresponds to a red color, the second color sub-pixel block G corresponds to a green color, and the third color sub-pixel block B corresponds to a blue color.

Figure 2A:
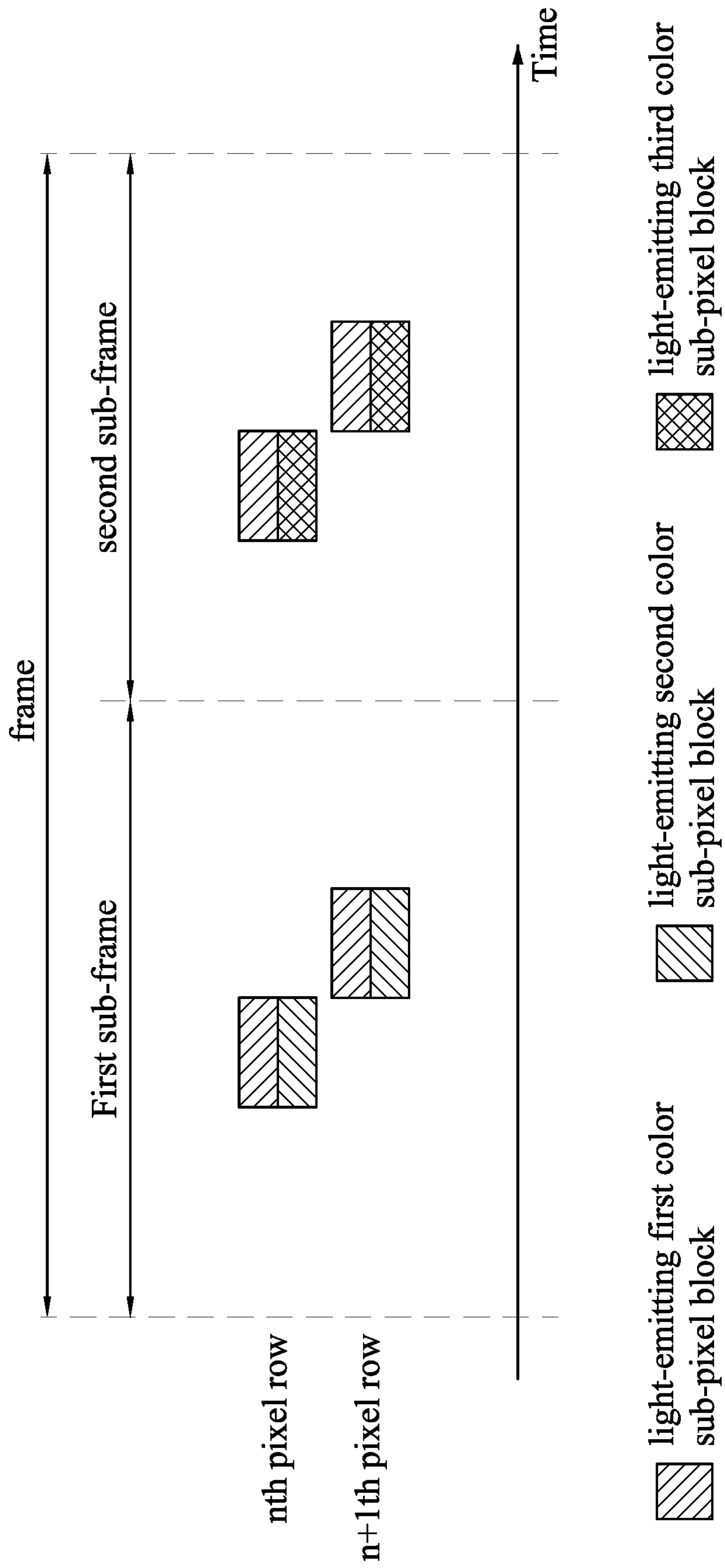
FIG. 2A is a schematic diagram showing a color sequence of a first sub-frame and a second sub-frame in accordance with an embodiment of the present invention.
Figure 2B:
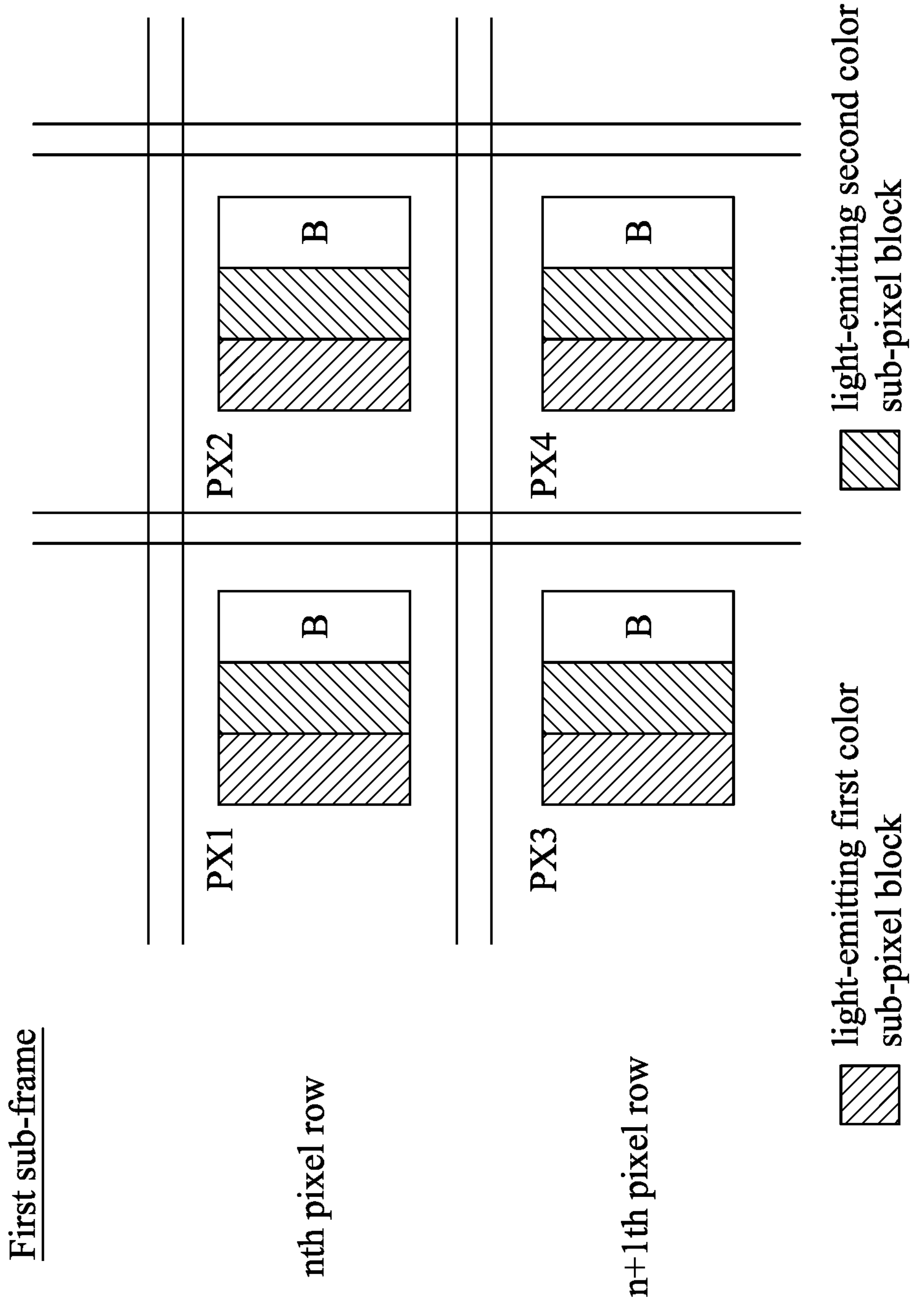
FIG. 2B and FIG. 2C are schematic diagrams showing light-emitting operations of pixel blocks when the first sub-frame and the second sub-frame are displayed.
Figure 2C:
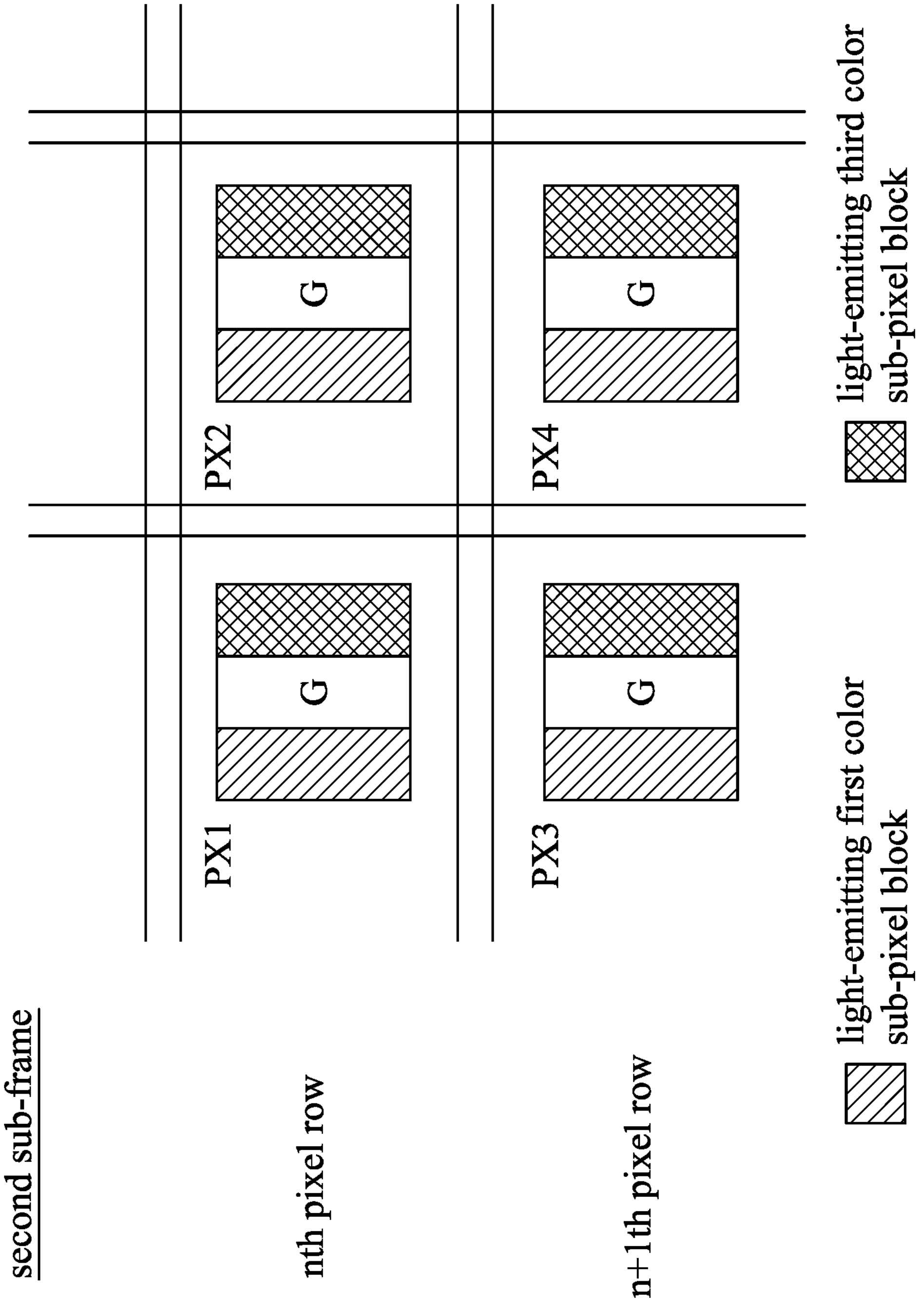

Referring to FIG. 2A to FIG. 2C, FIG. 2A is a schematic diagram showing a color sequence of a first sub-frame and a second sub-frame in accordance with an embodiment of the present invention; FIG. 2B and FIG. 2C are schematic diagrams showing light-emitting operations of pixel blocks PX1 to PX4 when the first sub-frame and the second sub-frame are displayed. In the present embodiments, the pixel blocks PX1 to PX4 in adjacent two nth and n+1th pixel rows are taken for an example for convenience of illustration, in which the pixel blocks PX1 to PX4 are disposed to be adjacent to each other, and n is a positive integer.

As shown in FIG. 2A, in this embodiment, a frame of the display device is divided into the first sub-frame and the second sub-frame. When the first sub-frame is displayed, the first color sub-pixel block and the second color sub-pixel block are controlled to emit lights to display different colors, for example the red color and the green color. When the second sub-frame is displayed, the first color sub-pixel block and the third color sub-pixel block are controlled to emit lights to display different colors, for example the red color and the blue color. Specifically, in this embodiment, the first sub-frame displays the first color (for example red) and the second color (for example green), and the second sub-frame displays the first color previously displayed by the first sub-frame and the third color (for example blue) not previously displayed by the first sub-frame. Therefore, the display device of this embodiment achieves the purpose of color display by using the above color sequence.

As shown in FIG. 2B, when the first sub-frame is displayed, the first color sub-pixel block R and the second color sub-pixel block G of the pixel blocks PX1 and PX2 in the nth pixel row are controlled to emit lights to display the first color and the second color, and the third color sub-pixel block B thereof does not emit any light; the first color sub-pixel block R and the second color sub-pixel block G of the pixel blocks PX3 and PX4 in the n+1th pixel row are controlled to emit lights to display the first color and the second color, and the third color sub-pixel block B thereof does not emit any light.

As shown in FIG. 2C, when the second sub-frame is displayed, the first color sub-pixel block R and the third color sub-pixel block B of the pixel blocks PX1 and PX2 in the nth pixel row are controlled to emit lights to display the first color and the third color, and the second color sub-pixel block G thereof does not emit any light; the first color sub-pixel block R and the third color sub-pixel block B of the pixel blocks PX3 and PX4 in the n+1th pixel row are controlled to emit lights to display the first color and the third color, and the second color sub-pixel block G thereof does not emit any light.

In accordance with the above FIG. 2A to FIG. 2C, the color sequence of the embodiments of FIG. 2A to FIG. 2C is red/green-red/blue, thereby achieving the purpose of color display.

Figure 3A:
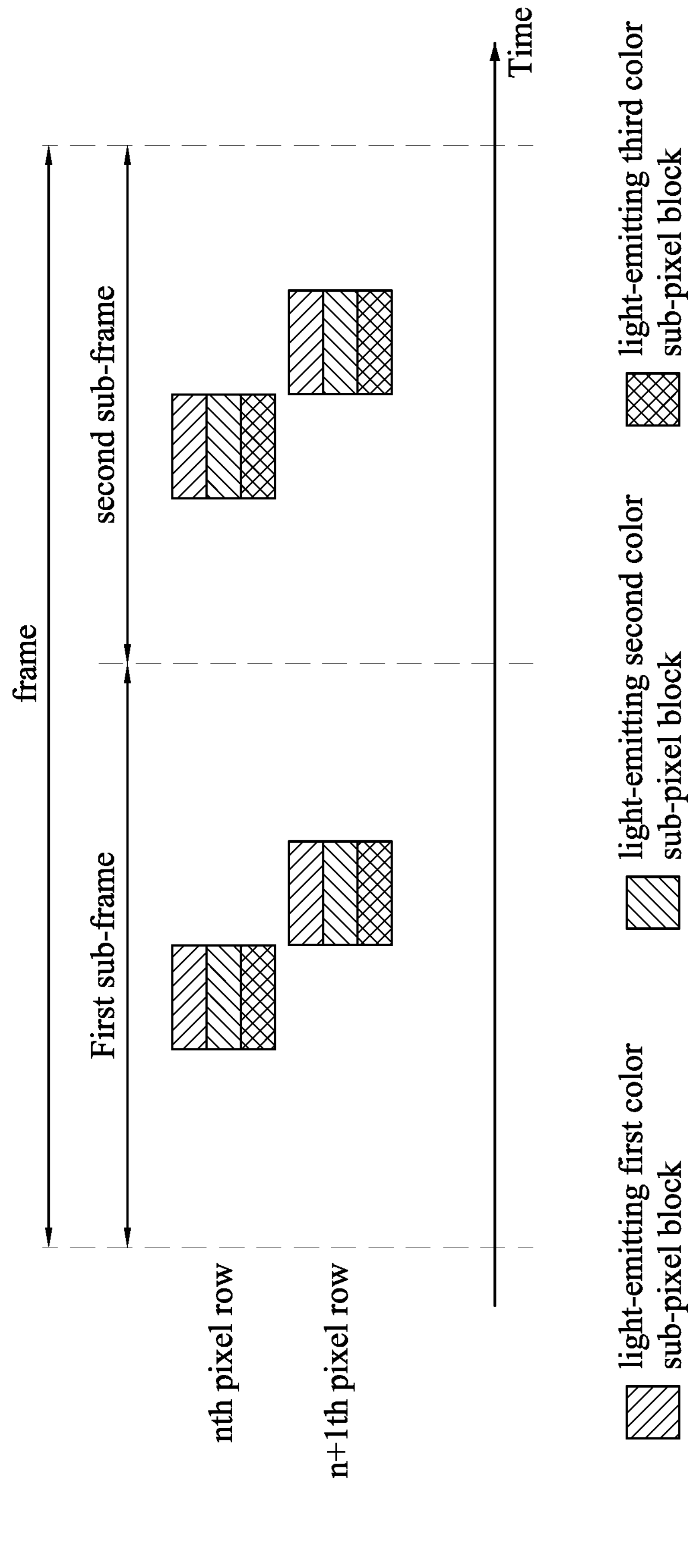
FIG. 3A is a schematic diagram showing a color sequence of a first sub-frame and a second sub-frame in accordance with an embodiment of the present invention.
Figure 3B:
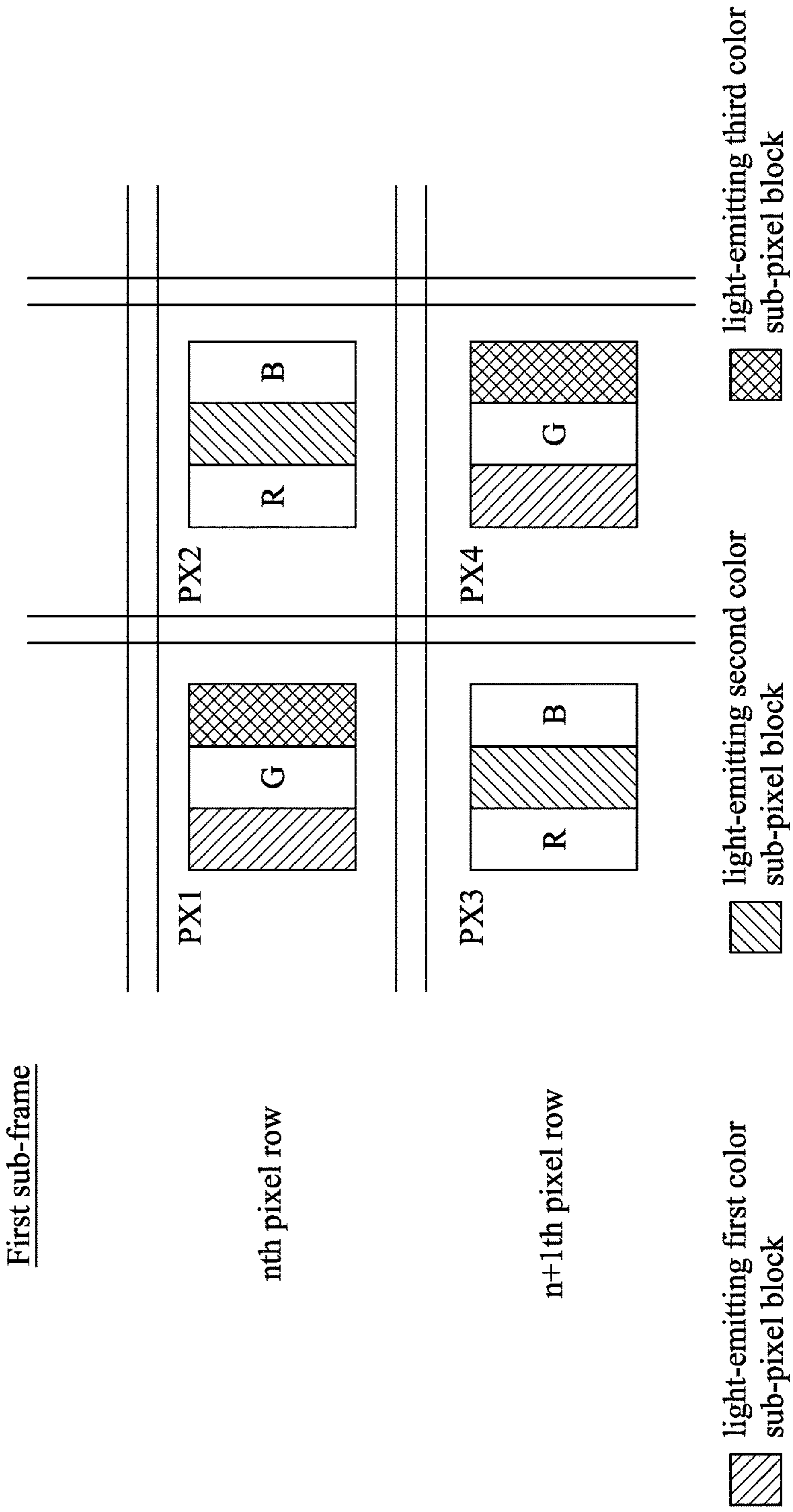
FIG. 3B and FIG. 3C are schematic diagrams showing light-emitting operations of pixel blocks when the first sub-frame and the second sub-frame are displayed.
Figure 3C:
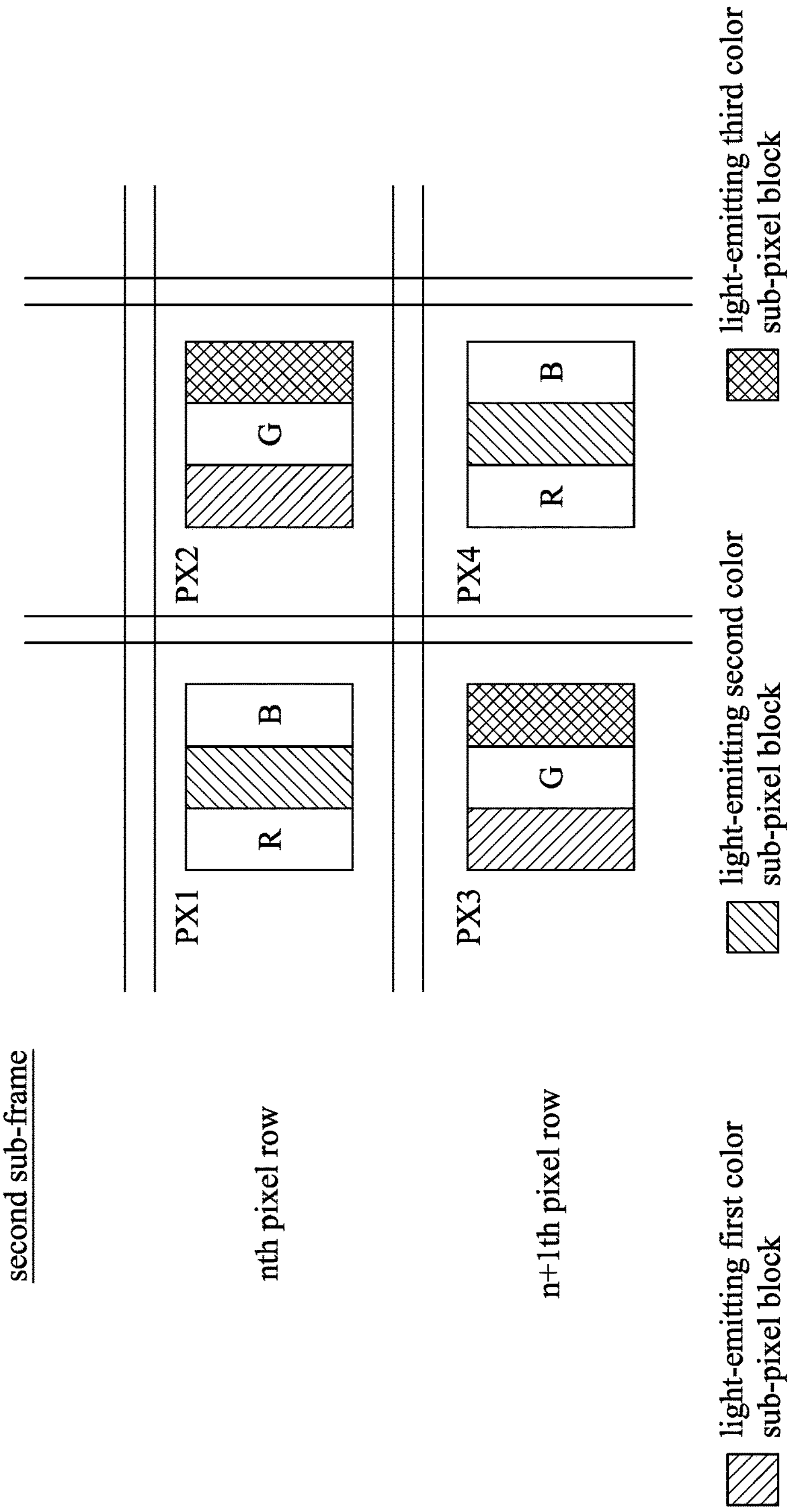

Referring to FIG. 3A to FIG. 3C, FIG. 3A is a schematic diagram showing a color sequence of a first sub-frame and a second sub-frame in accordance with an embodiment of the present invention; FIG. 3B and FIG. 3C are schematic diagrams showing light-emitting operations of pixel blocks PX1 to PX4 when the first sub-frame and the second sub-frame are displayed.

As shown in FIG. 3A, similar to the above embodiment, the frame of the display device is divided into the first sub-frame and the second sub-frame. When the first sub-frame is displayed, the first color sub-pixel block, the second color sub-pixel block and the third color sub-pixel block are controlled to emit lights to display three different colors, for example the red color, the green color and the blue color. Similarly, when the second sub-frame is displayed, the first color sub-pixel block, the second color sub-pixel block and the third color sub-pixel block are also controlled to emit lights to display three different colors, for example the red color, the green color and the blue color. Specifically, in this embodiment, both the first sub-frame and the second sub-frame display the first color (for example red) and the second color (for example green) and the third color (for example blue).

As shown in FIG. 3B, when the first sub-frame is displayed, the first color sub-pixel block R and the third color sub-pixel block B of the pixel block PX1 in the nth pixel row are controlled to emit lights to display the first color and the third color, and the second color sub-pixel block G of the pixel block PX2 is controlled to emit light to display the second display, and the second color sub-pixel block G of the pixel block PX1 and the first color sub-pixel block R and the third color sub-pixel block B of the pixel block PX2 do not emit any lights; the second color sub-pixel block G of the pixel blocks PX3 in the n+1th pixel row is controlled to emit light to display the second color, and the first color sub-pixel block R and the third color sub-pixel block B of the pixel block PX4 are controlled to emit lights to display the first color and the third color, and the first color sub-pixel block R and the third color sub-pixel block B of the pixel block PX3 and the second color sub-pixel block G of the pixel blocks PX4 do not emit any light.

As shown in FIG. 3C, when the second sub-frame is displayed, the second color sub-pixel block G of the pixel block PX1 in the nth pixel row is controlled to emit light to display the second color, the first color sub-pixel block R and the third color sub-pixel block B of the pixel block PX2 are controlled to emit lights to display the first color and the third color, and the first color sub-pixel block R and the third color sub-pixel block B of the pixel block PX1 and the second color sub-pixel block G of the pixel block PX2 do not emit any light; the first color sub-pixel block R and the third color sub-pixel block B of the pixel blocks PX3 in the n+1th pixel row are controlled to emit lights to display the first color and the third color, the second color sub-pixel block G of the pixel block PX4 is controlled to emit light to display the second color, and the second color sub-pixel block G of the pixel block PX3 and the first color sub-pixel block R and the third color sub-pixel block B of the pixel blocks PX4 do not emit any light.

In accordance with the above FIG. 3A to FIG. 3C, the pixel block PX1 displays the first color and the third color when the first sub-frame is displayed, and the pixel block PX1 displays the second color when the second sub-frame is displayed. Therefore, the color sequence of the pixel block PX1 in the whole frame display time period can be for example, red/blue-green, and the purpose of color display for the pixel PX1 can be achieved accordingly. The pixel block PX2 displays the second color when the first sub-frame is displayed, and the pixel block PX2 displays the first color and the third color when the second sub-frame is displayed. Therefore, the color sequence of the pixel block PX2 in the whole frame display time period can be for example, green-red/blue, and the purpose of color display for the pixel PX2 can be achieved accordingly. The pixel block PX3 displays the second color when the first sub-frame is displayed, and the pixel block PX3 displays the first color and the third color when the second sub-frame is displayed. Therefore, the color sequence of the pixel block PX3 in the whole frame display time period can be for example, green-red/blue, and the purpose of color display for the pixel PX3 can be achieved accordingly. The pixel block PX4 displays the first color and the third color when the first sub-frame is displayed, and the pixel block PX4 displays the second color when the second sub-frame is displayed. Therefore, the color sequence of the pixel block PX4 in the whole frame display time period can be for example, red/blue-green, and the purpose of color display for the pixel PX4 can be achieved accordingly.

In addition, in the time periods for displaying the first sub-frame and the second sub-frame, the pixel blocks in each of the pixel rows are controlled to display in a sequence of green-red/blue-green-red/blue, and the pixel blocks in each of the pixel columns are controlled to display in a sequence of green-red/blue-green-red/blue as well. The above alternative display operations are capable of allowing the color display effect of the display device to be more uniform.

Figure 4A:
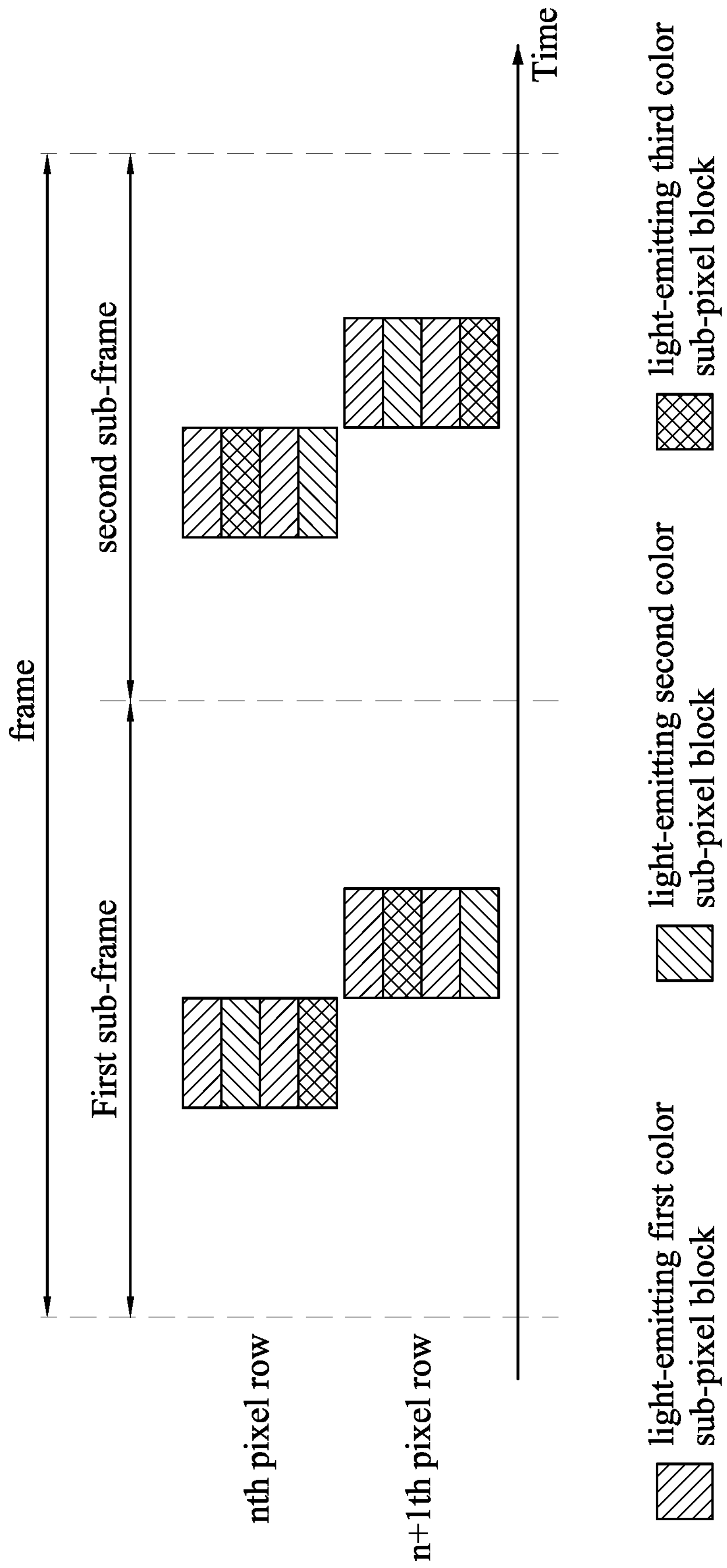
FIG. 4A is a schematic diagram showing the color sequence of the first sub-frame and the second sub-frame in accordance with an embodiment of the present invention.
Figure 4B:
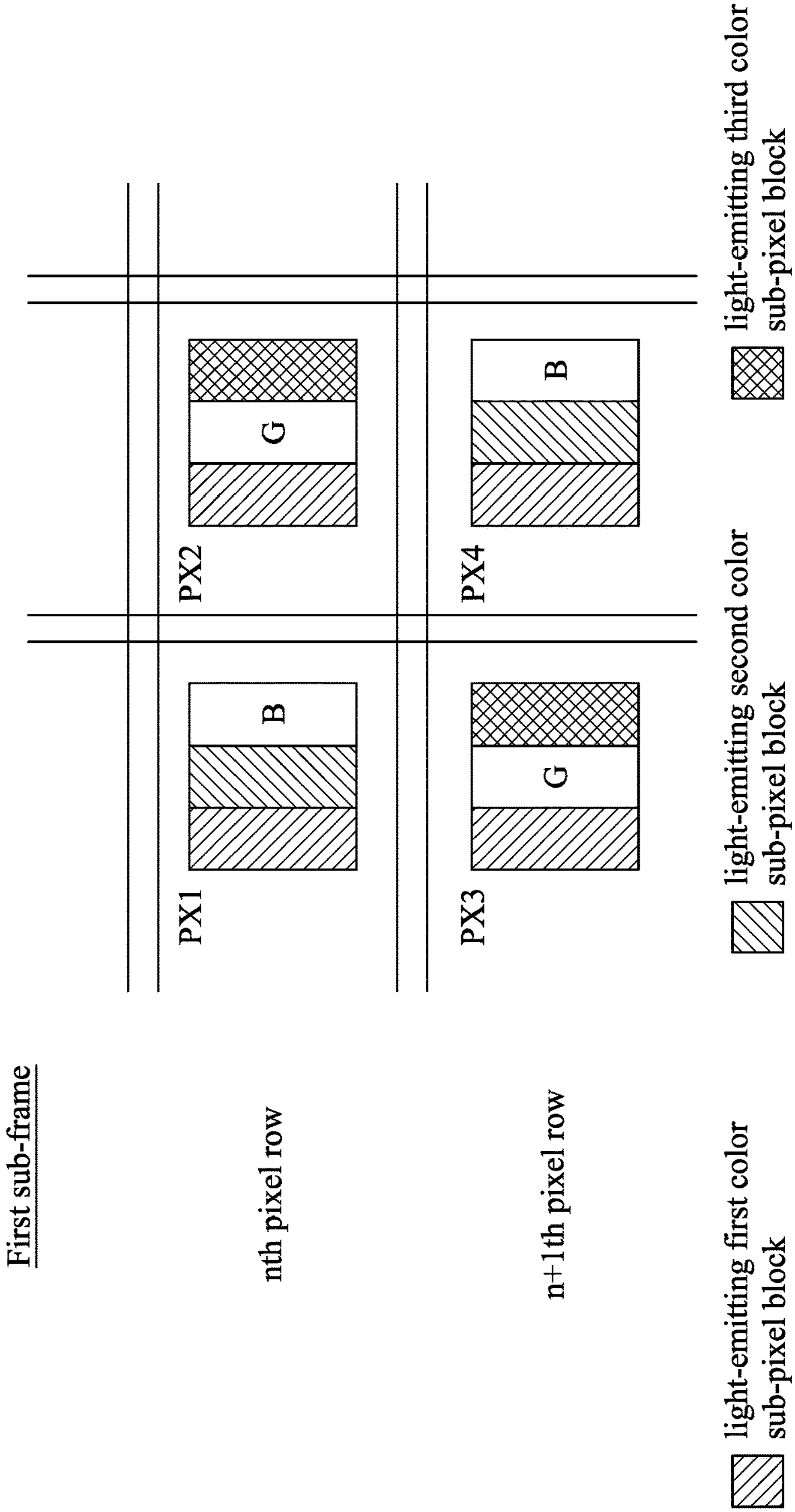
FIG. 4B and FIG. 4C are schematic diagrams showing the light-emitting operations of pixel blocks when the first sub-frame and the second sub-frame are displayed.
Figure 4C:
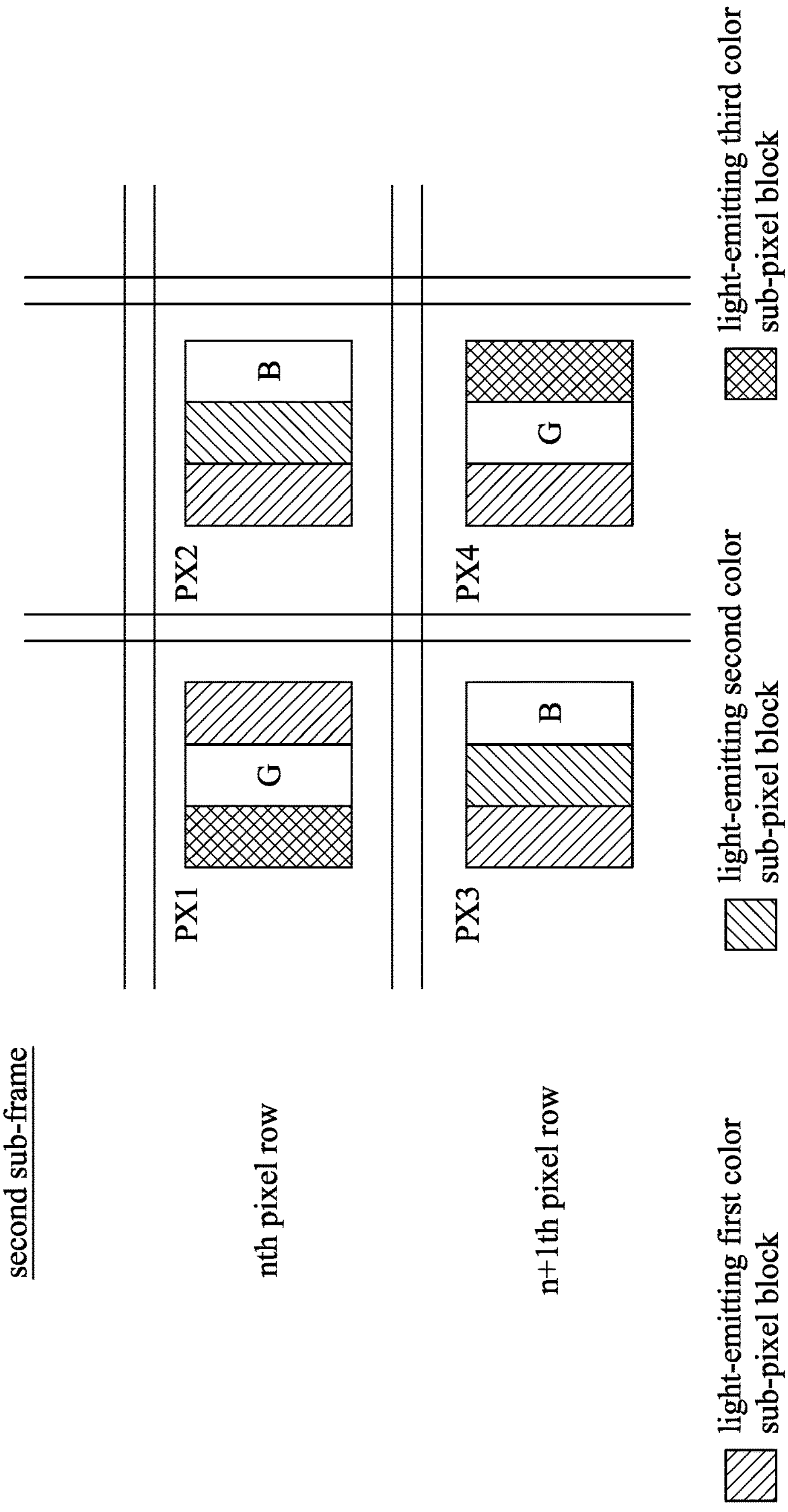

Referring to FIG. 4A to FIG. 4C, FIG. 4A is a schematic diagram showing the color sequence of the first sub-frame and the second sub-frame in accordance with an embodiment of the present invention; FIG. 4B and FIG. 4C are schematic diagrams showing the light-emitting operations of pixel blocks PX1 to PX4 when the first sub-frame and the second sub-frame are displayed.

As shown in FIG. 4A, similar to the above embodiment, the frame of the display device is divided into the first sub-frame and the second sub-frame. When the first sub-frame is displayed, the first color sub-pixel block, the second color sub-pixel block and the third color sub-pixel block are controlled to emit lights to display three different colors, for example the red color, the green color and the blue color. Similarly, when the second sub-frame is displayed, the first color sub-pixel block, the second color sub-pixel block and the third color sub-pixel block are also controlled to emit lights to display three different colors, for example the red color, the green color and the blue color. Specifically, in this embodiment, both the first sub-frame and the second sub-frame display the first color (for example red) and the second color (for example green) and the third color (for example blue).

As shown in FIG. 4B, when the first sub-frame is displayed, the first color sub-pixel block R and the second color sub-pixel block G of the pixel block PX1 in the nth pixel row are controlled to emit lights to display the first color and the second color, and the first color sub-pixel block R and the third color sub-pixel block B of the pixel block PX2 are controlled to emit light to display the first color and the third color, and the third color sub-pixel block B of the pixel block PX1 and the first color sub-pixel block R and the second color sub-pixel block G of the pixel block PX2 do not emit any light; the first color sub-pixel block R and the third color sub-pixel block B of the pixel block PX3 in the n+1th pixel row are controlled to emit lights to display the first color and the third color, and the first color sub-pixel block R and the second color sub-pixel block G of the pixel block PX4 are controlled to emit lights to display the first color and the second color, and the second color sub-pixel block G of the pixel block PX3 and third color sub-pixel block B of the pixel block PX4 do not emit any light.

As shown in FIG. 4C, when the second sub-frame is displayed, the first color sub-pixel block R and the third color sub-pixel block B of the pixel block PX1 in the nth pixel row is controlled to emit lights to display the first color and the third color, and the first color sub-pixel block R and the second color sub-pixel block G of the pixel block PX2 are controlled to emit lights to display the first color and the second color, and the second color sub-pixel block G of the pixel block PX1 and the third color sub-pixel block B of the pixel block PX2 do not emit any light; the first color sub-pixel block R and the second color sub-pixel block G of the pixel blocks PX3 in the n+1th pixel row are controlled to emit lights to display the first color and the second color, and the first color sub-pixel block R and the third color sub-pixel block B of the pixel block PX4 are controlled to emit lights to display the first color and the third color, and the third color sub-pixel block B of the pixel block PX3 and the second color sub-pixel block G of the pixel blocks PX4 do not emit any light.

In accordance with the above FIG. 4A to FIG. 4C, the pixel block PX1 displays the first color and the second color when the first sub-frame is displayed, and the pixel block PX1 displays the first color and the third color when the second sub-frame is displayed. Therefore, the color sequence of the pixel block PX1 in the whole frame display time period can be for example, red/green-red/blue, and the purpose of color display for the pixel PX1 can be achieved accordingly. The pixel block PX2 displays the first color and the third color when the first sub-frame is displayed, and the pixel block PX2 displays the first color and the second color when the second sub-frame is displayed. Therefore, the color sequence of the pixel block PX2 in the whole frame display time period can be for example, red-blue-red/green, and the purpose of color display for the pixel PX2 can be achieved accordingly. The pixel block PX3 displays the first color and the third color when the first sub-frame is displayed, and the pixel block PX3 displays the first color and the second color when the second sub-frame is displayed. Therefore, the color sequence of the pixel block PX3 in the whole frame display time period can be for example, red/blue-red/green, and the purpose of color display for the pixel PX3 can be achieved accordingly. The pixel block PX4 displays the first color and the second color when the first sub-frame is displayed, and the pixel block PX4 displays the first color and the third color when the second sub-frame is displayed. Therefore, the color sequence of the pixel block PX4 in the whole frame display time period can be for example, red/green-red/blue, and the purpose of color display for the pixel PX4 can be achieved accordingly.

In addition, in the time periods for displaying the first sub-frame and the second sub-frame, the pixel blocks in each of the pixel rows are controlled to display in a sequence of red/green-red/blue-red/green-red/blue, and the pixel blocks in each of the pixel columns are controlled to display in a sequence of red/green-red/blue-red/green-red/blue as well. The above alternative display operations are capable of allowing the color display effect of the display device to be more uniform.

Figure 5A:
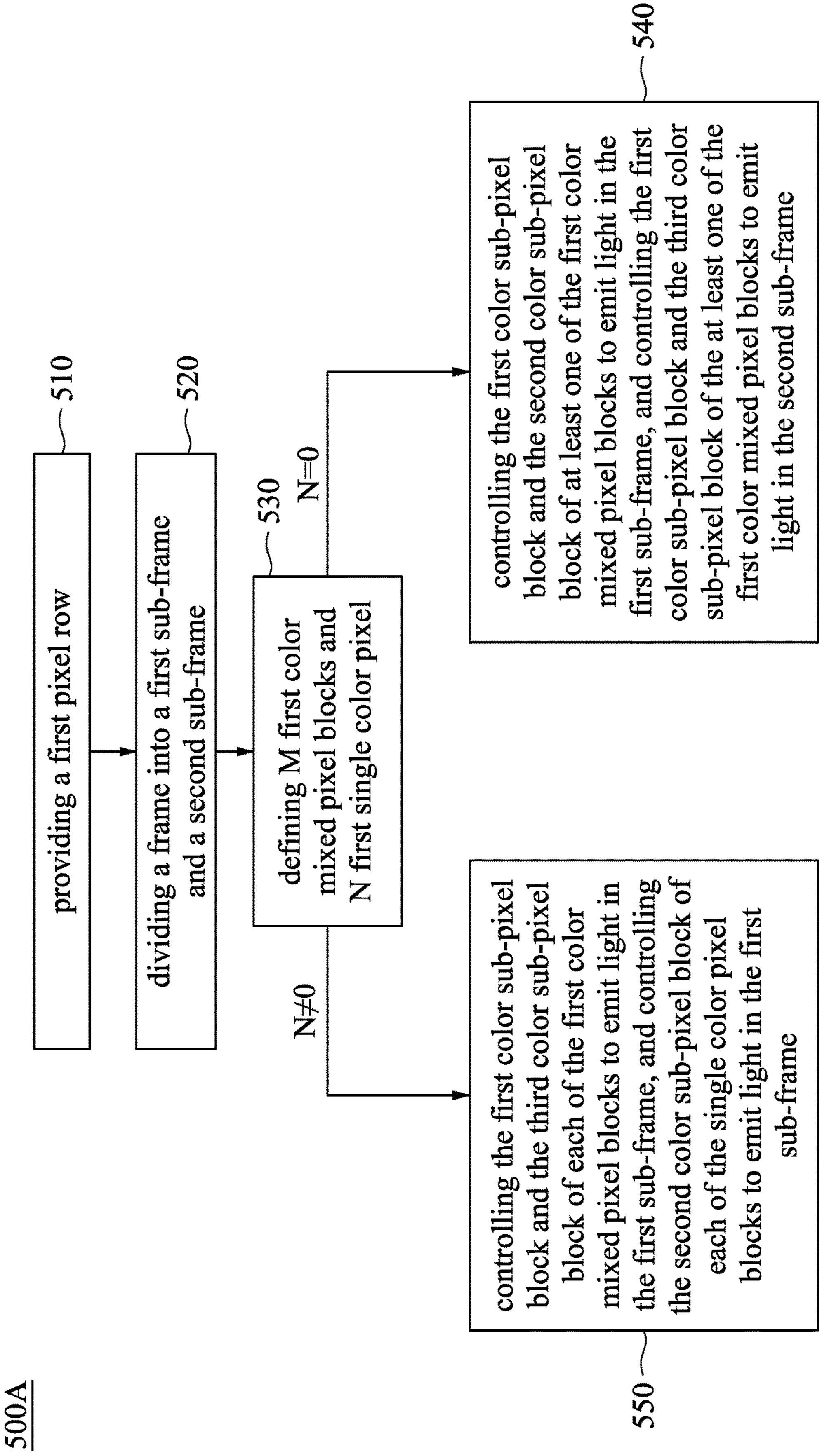
FIG. 5A and FIG. 5B are schematic diagrams showing flow charts of control methods of the display device.
Figure 5B:
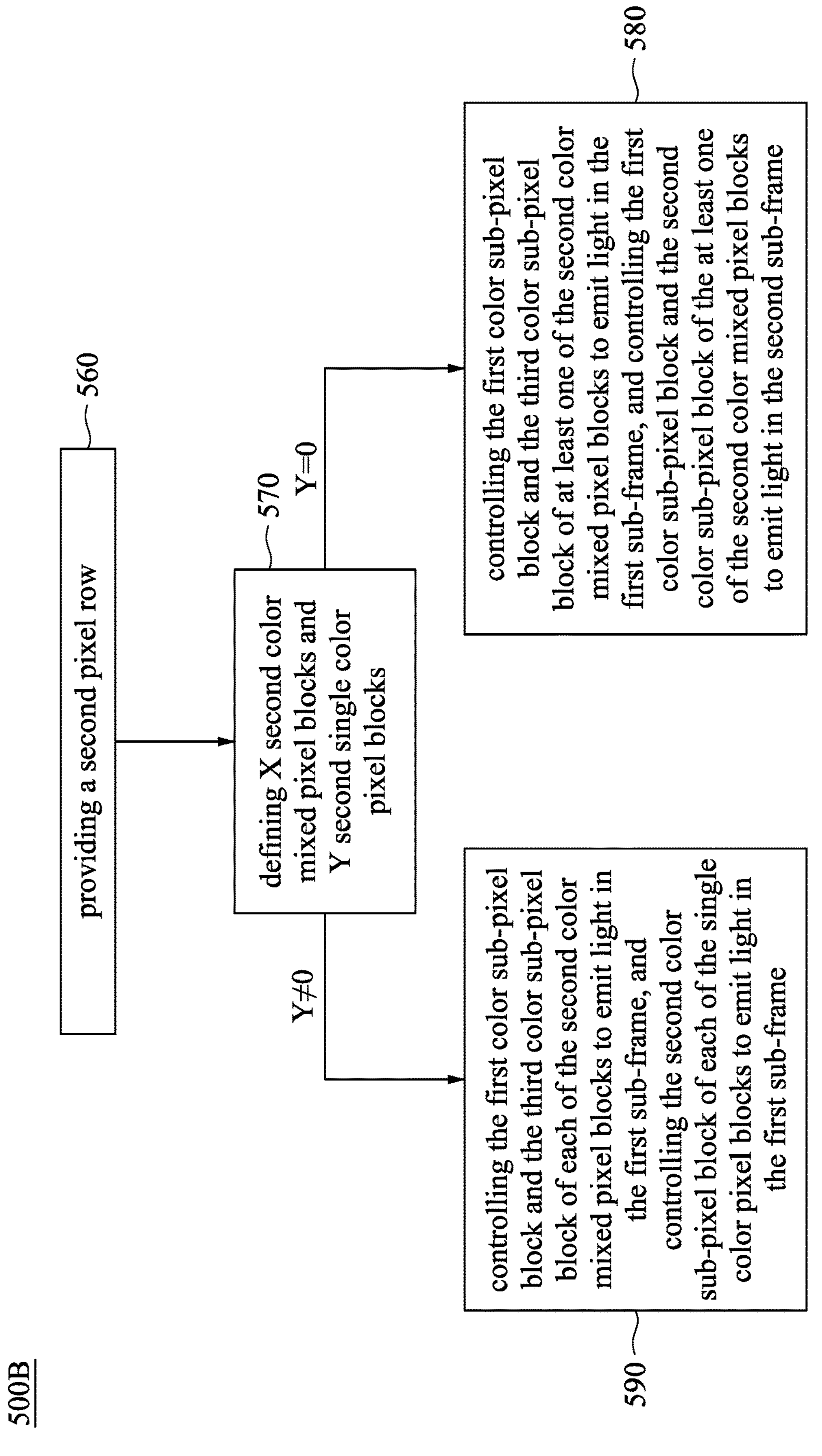

Referring FIG. 5A and FIG. 5B, FIG. 5A and FIG. 5B are schematic diagrams showing flow charts of control methods 500A and 500B of the display device. As shown in FIG. 5A, in the control method 500A, step 510 is performed to provide a first pixel row (for example the above nth pixel row). Then, step 520 is performed to divide the frame into the first sub-frame and the second sub-frame, as shown in the above FIG. 2A, FIG. 3A and FIG. 4A. Thereafter, step 530 is performed to define M first color mixed pixel blocks and N first single color pixel blocks. The first color mixed pixel block is a pixel block displaying two colors (for example the pixel block PX1 shown in FIG. 2B), and the first single color pixel block is a pixel block displaying a single color (for example the pixel block PX2 shown in FIG. 3B). In the embodiments of the present invention, M is an integer greater than 1, and N is an integer greater or equal to 0.

Specifically, when N=0, step 540 is performed to control the first color sub-pixel block and the second color sub-pixel block of at least one of the first color mixed pixel blocks to emit lights in the first sub-frame, and to control the first color sub-pixel block and the third color sub-pixel block of the at least one of the first color mixed pixel blocks to emit lights in the second sub-frame. For example, as shown in FIG. 2B and FIG. 2C, the first color sub-pixel block and the second color sub-pixel block of the pixel block PX1 are controlled to emit lights in the first sub-frame, and the first color sub-pixel block and the third color sub-pixel block of the pixel block PX1 are controlled to emit lights in the second sub-frame. For another example, as shown in FIG. 4B and FIG. 4C, the first color sub-pixel block and the second color sub-pixel block of the pixel block PX1 are controlled to emit lights in the first sub-frame, and the first color sub-pixel block and the third color sub-pixel block of the pixel block PX1 are controlled to emit lights in the second sub-frame.

When N≠0, step 550 is performed to control the first color sub-pixel block and the third color sub-pixel block of each of the first color mixed pixel blocks to emit lights in the first sub-frame, and to control the second color sub-pixel block of each of the first single color pixel blocks to emit light in the first sub-frame. For example, as shown in FIG. 3B, the first color sub-pixel block and the third color sub-pixel block of the pixel block PX1 are controlled to emit lights in the first sub-frame, and the second color sub-pixel block of the pixel block PX2 is also controlled to emit light in the first sub-frame. It is noted that a pixel block previously defined to be the color mixed pixel block or the single color pixel block can be subsequently defined again to be the color mixed pixel block or the single color pixel block. For example, in the first sub-frame, the pixel blocks PX1 and PX4 are defined to be the color mixed pixel blocks, but in the subsequent second sub-frame, the pixel blocks PX1 and PX4 are defined again to be the single color pixel blocks. Similarly, in the first sub-frame, the pixel blocks PX2 and PX3 are defined to be the single color pixel block, but in the subsequent second sub-frame, the pixel blocks PX2 and PX3 are defined again to be the color mixed pixel blocks.

As shown in in FIG. 5B, in the control method 500B, step 560 is performed to provide a second pixel row (for example the above n+1th pixel row). Then, step 570 is performed to define X second color mixed pixel blocks and Y second single color pixel blocks. Similarly, the second color mixed pixel block is a pixel block displaying two colors (for example the pixel block PX3 shown in FIG. 2B), and the second single color pixel block is a pixel block displaying a single color (for example the pixel block PX3 shown in FIG. 3B). In the embodiments of the present invention, X is an integer greater than 1, and Y is an integer greater or equal to 0.

Specifically, when Y=0, step 580 is performed to control the first color sub-pixel block and the second color sub-pixel block of at least one of the second color mixed pixel blocks to emit lights in the first sub-frame, and to control the first color sub-pixel block and the third color sub-pixel block of the at least one of the second color mixed pixel blocks to emit lights in the second sub-frame. For example, as shown in FIG. 2B and FIG. 2C, the first color sub-pixel block and the second color sub-pixel block of the pixel block PX4 are controlled to emit lights in the first sub-frame, and the first color sub-pixel block and the third color sub-pixel block of the pixel block PX4 are controlled to emit lights in the second sub-frame. For another example, as shown in FIG. 4B and FIG. 4C, the first color sub-pixel block and the second color sub-pixel block of the pixel block PX4 are controlled to emit lights in the first sub-frame, and the first color sub-pixel block and the third color sub-pixel block of the pixel block PX4 are controlled to emit lights in the second sub-frame.

When Y≠0, step 550 is performed to control the first color sub-pixel block and the third color sub-pixel block of each of the second color mixed pixel blocks to emit lights in the first sub-frame, and to control the second color sub-pixel block of each of the second single color pixel blocks to emit light in the first sub-frame. For example, as shown in FIG. 3B, the first color sub-pixel block and the third color sub-pixel block of the pixel block PX4 are controlled to emit lights in the first sub-frame, and the second color sub-pixel block of the pixel block PX3 is also controlled to emit light in the first sub-frame.

Figure 6:
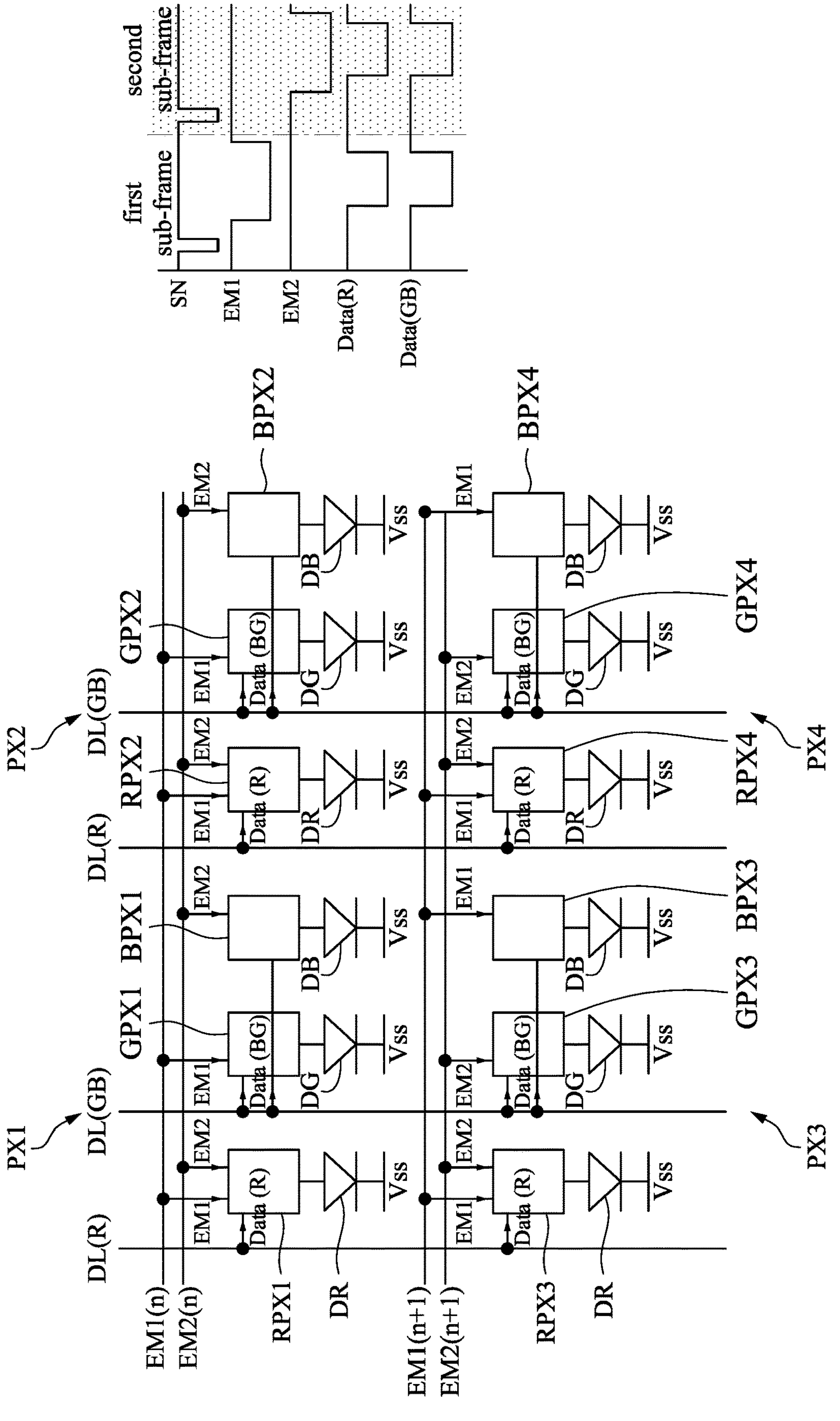
FIG. 6 is a schematic diagram showing a circuit structure of the display device in accordance with an embodiment of the present invention.

Referring to FIG. 6, FIG. 6 is a schematic diagram showing a circuit structure of the display device in accordance with an embodiment of the present invention. The circuit structure of the display device of FIG. 6 corresponds to the embodiments of the above FIG. 2A to FIG. 2C. As shown in FIG. 6, the pixel block PX1 includes a first color pixel circuit RPX1, a second color pixel circuit GPX1, a third color pixel circuit BPX1, a first color light-emitting diode DR, a second color light-emitting diode DG and a third color light-emitting diode DB. The first color pixel circuit RPX1 and the first color light-emitting diode DR form the first color sub-pixel block R of the pixel block PX1; the second color pixel circuit GPX1 and the second color light-emitting diode DG form the second color sub-pixel block G of the pixel block PX1; the third color pixel circuit BPX1 and the third color light-emitting diode DB form the third color sub-pixel block B of the pixel block PX1. In the embodiments of the present invention, the first color light-emitting diode DR, the second color light-emitting diode DG and the third color light-emitting diode DB are micro light-emitting diode; μLED), and the first color light-emitting diode DR is a red micro light-emitting diode, the second color light-emitting diode DG is a green micro light-emitting diode, and the third color light-emitting diode DB is a blue micro light-emitting diode. However, the embodiments of the present invention are not limited thereto.

The pixel block PX1 is electrically connected to scan lines EM1(*n*), EM2(*n*) and data lines DL(R), DL(GB) to receive scan line signals EM1, EM2 of the scan lines EM1(*n*), EM2(*n*) and pixel data signals Data(R), Data(GB) of the data lines DL(R), DL(GB). Therefore, the first color light-emitting diode DR, the second color light-emitting diode DG and the third color light-emitting diode DB are controlled to emit lights in accordance with the pixel data signals Data(R), Data(GB). Specifically, in the pixel block PX1, the first color pixel circuit RPX1 is electrically connected to the scan lines EM1(*n*), EM2(*n*) and the data line DL(R) to receive the scan line signals EM1, EM2 and the pixel data signal Data(R) to control the first color light-emitting diode DR to emit light; the second color pixel circuit GPX1 is electrically connected to the scan line EM1(*n*) and the data line DL(GB) to receive the scan line signal EM1 and the pixel data signal Data(GB)

to control the second color light-emitting diode DG to emit light; the third color pixel circuit BPX1 is electrically connected to the scan line EM2(*n*) and the data line DL(GB) to receive the scan line signal EM2 and the pixel data signal Data(GB) to control the third color light-emitting diode DB to emit light. It is noted that the pixel data signal Data(GB) corresponds to the second color light-emitting diode DG when the second color pixel circuit GPX1 receives the scan line signal EM1 to control the second color light-emitting diode DG to emit light, and the pixel data signal Data(GB) corresponds to the third color light-emitting diode DB when the third color pixel circuit BPX1 receives the scan line signal EM1 to control the second color light-emitting diode DG to emit light.

The pixel block PX2 includes a first color pixel circuit RPX2, a second color pixel circuit GPX2, a third color pixel circuit BPX2, a first color light-emitting diode DR, a second color light-emitting diode DG and a third color light-emitting diode DB. Since the circuit structure of the pixel block PX2 is similar to the circuit structure of the pixel block PX1, the detail of the circuit structure of the pixel block PX2 is not repeated herein.

The pixel block PX3 includes a first color pixel circuit RPX3, a second color pixel circuit GPX3, a third color pixel circuit BPX3, a first color light-emitting diode DR, a second color light-emitting diode DG and a third color light-emitting diode DB. Since the pixel block PX3 and the pixel block PX1 are located at different pixel rows, the pixel block PX3 is electrically connected to scan lines EM1(*n*+1), EM2(*n*+1) to receive scan line signals EM1 and EM2 of the scan lines EM1(*n*+1), EM2(*n*+1). The circuit structure of the pixel block PX3 is similar to the circuit structure of the pixel block PX1, but the difference is in that the second color pixel circuit GPX3 of the pixel block PX3 is electrically connected to the scan line EM2(*n*+1) to receive the scan line signal EM2, and the third color pixel circuit BPX3 of the pixel block PX3 is electrically connected to the scan line EM1(*n*+1) to receive the scan line signal EM1.

The pixel block PX4 includes a first color pixel circuit RPX4, a second color pixel circuit GPX4, a third color pixel circuit BPX4, a first color light-emitting diode DR, a second color light-emitting diode DG and a third color light-emitting diode DB. Since the circuit structure of the pixel block PX4 is similar to the circuit structure of the pixel block PX3, the detail of the circuit structure of the pixel block PX4 is not repeated herein.

Time sequences of the scan line signals EM1, EM2 and the pixel data signals Data(R), Data(GB) are shown in a signal sequence diagram at the right side of FIG. 6. In the first sub-frame, when the signal SN is enabled, the scan line signal EM1 is then enabled. Thereafter, it begins to transmit the pixel data signals Data(R), Data(GB). In the second sub-frame, when the signal SN is enabled, the scan line signal EM2 is then enabled. Thereafter, it begins to transmit the pixel data signals Data(R), Data(GB).

Figure 7:
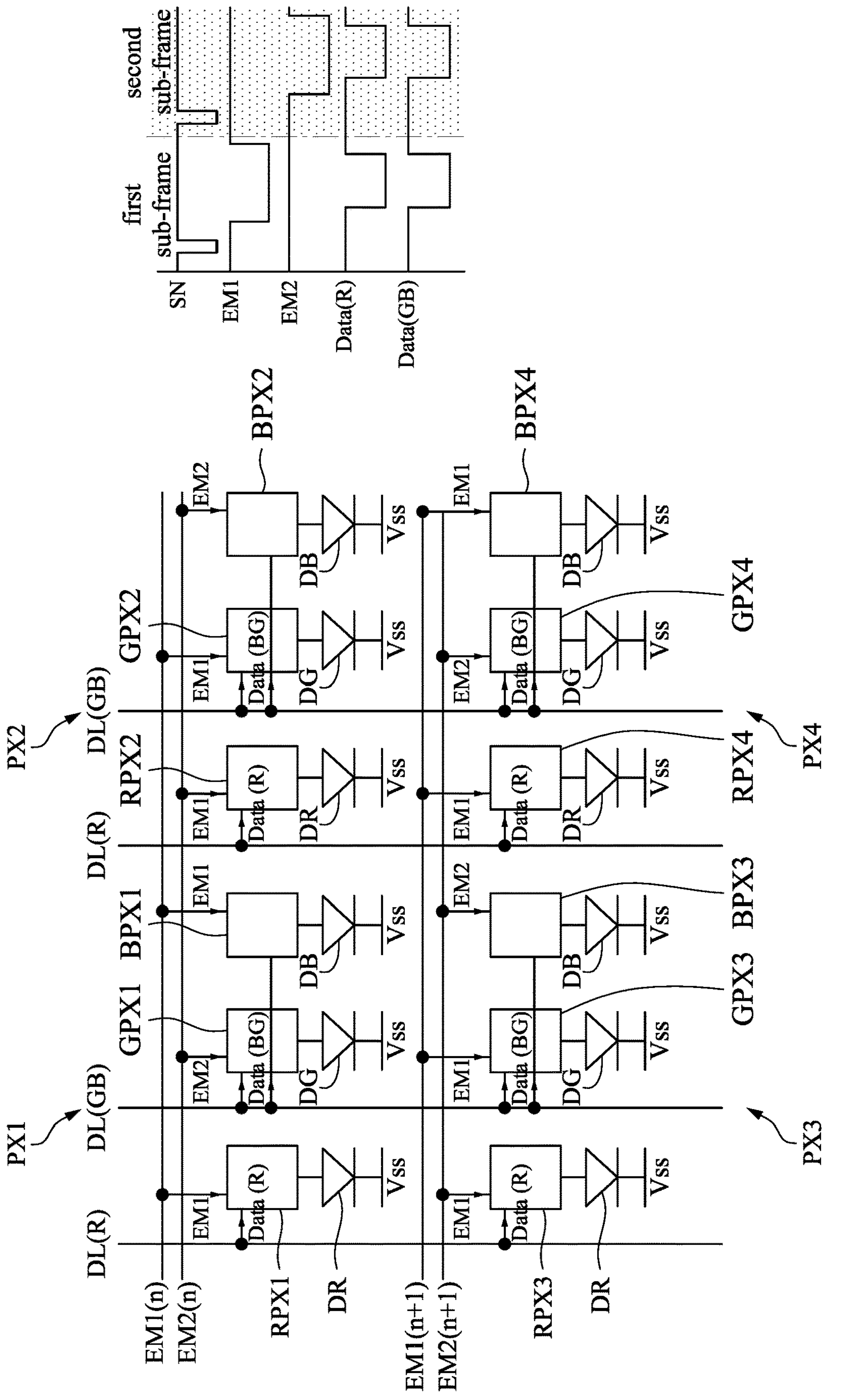
FIG. 7 is a schematic diagram showing a circuit structure of the display device in accordance with an embodiment of the present invention.

Referring to FIG. 7, FIG. 7 is a schematic diagram showing a circuit structure of the display device in accordance with an embodiment of the present invention. The circuit structure of the display device of FIG. 7 corresponds to the embodiments of the above FIG. 3A to FIG. 3C. The circuit structure of the display device shown in FIG. 7 is similar to the circuit structure of the display device shown in FIG. 6, but the difference is in that the first color pixel circuit RPX1 of the pixel block PX1 is electrically connected to the scan line EM1(*n*), and not electrically connected to the scan line EM2(*n*); the second color pixel circuit GPX1 of the pixel block PX1 is electrically connected to the scan line EM2(*n*); the third color pixel circuit BPX1 of the pixel block PX1 is electrically connected to the scan line EM1(*n*); the first color pixel circuit RPX2 of the pixel block PX2 is electrically connected to the scan line EM2(*n*), and not electrically connected to the scan line EM1(*n*); the first color pixel circuit RPX3 of the pixel block PX3 is electrically connected to the scan line EM2(*n*+1), and not electrically connected to the scan line EM1(*n*+1); the second color pixel circuit GPX3 of the pixel bock PX3 is electrically connected to the scan line EM1(*n*+1); the third color pixel circuit BPX3 of the pixel block PX3 is electrically connected to the scan line EM2(*n*+1); the first color pixel circuit RPX4 of the pixel block PX4 is electrically connected to the scan line EM1 (*n*+1), and not electrically connected to the scan line EM2 (*n*+1).

Figure 8:
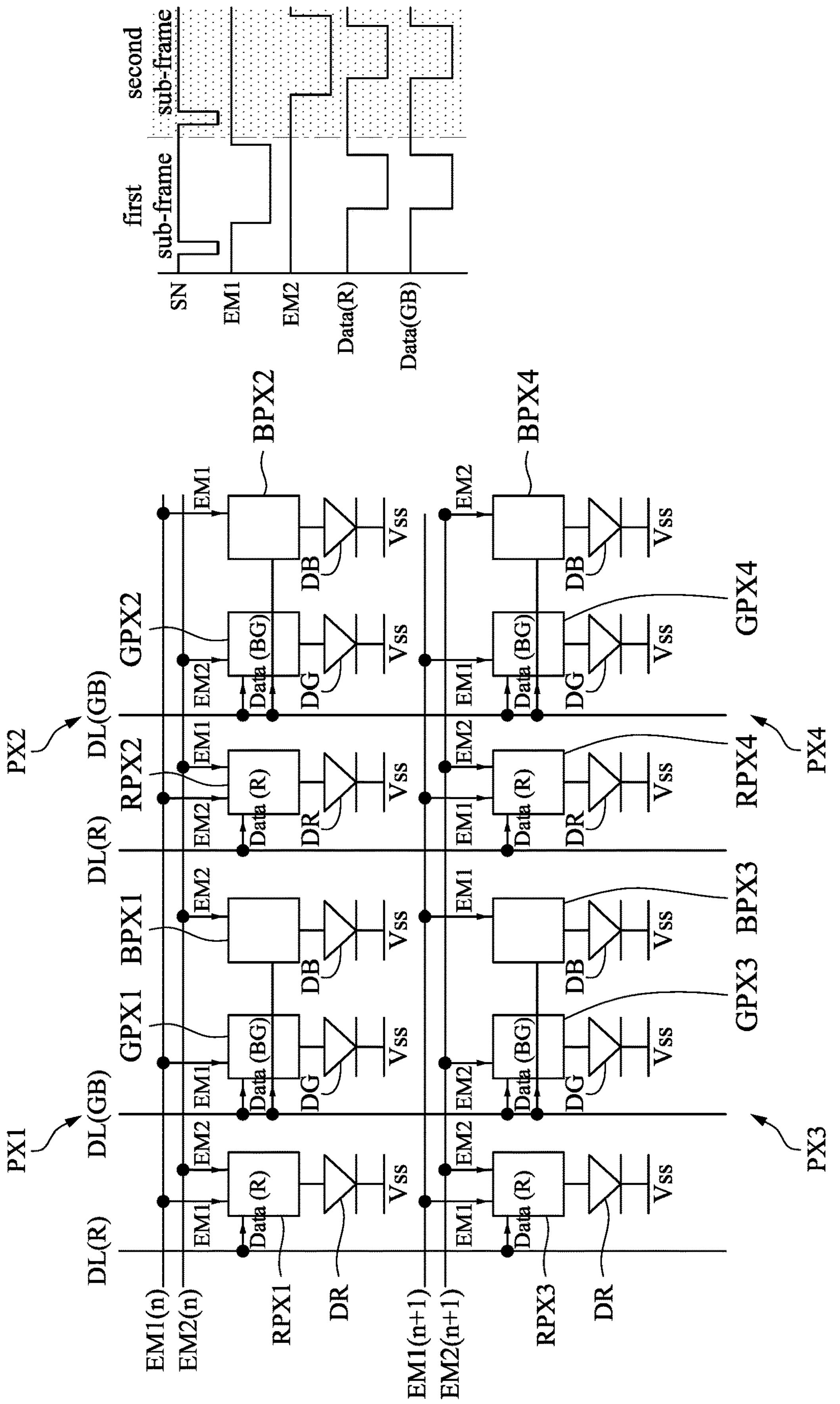
FIG. 8 is a schematic diagram showing a circuit structure of the display device in accordance with an embodiment of the present invention.

Referring to FIG. 8, FIG. 8 is a schematic diagram showing a circuit structure of the display device in accordance with an embodiment of the present invention. The circuit structure of the display device of FIG. 8 corresponds to the embodiments of the above FIG. 4A to FIG. 4C.

The circuit structure of the display device shown in FIG. 8 is similar to the circuit structure of the display device shown in FIG. 6, but the difference is in that the second color pixel circuit GPX2 of the pixel block PX2 is electrically connected to the scan line EM2(*n*); the third color pixel circuit BPX2 of the pixel block PX2 is electrically connected to the scan line EM1(*n*); the second color pixel circuit GPX4 of the pixel block PX4 is electrically connected to the scan line EM1(*n*+1); the third color pixel circuit BPX4 of the pixel block PX4 is electrically connected to the scan line EM2(*n*+1).

Figure 9:
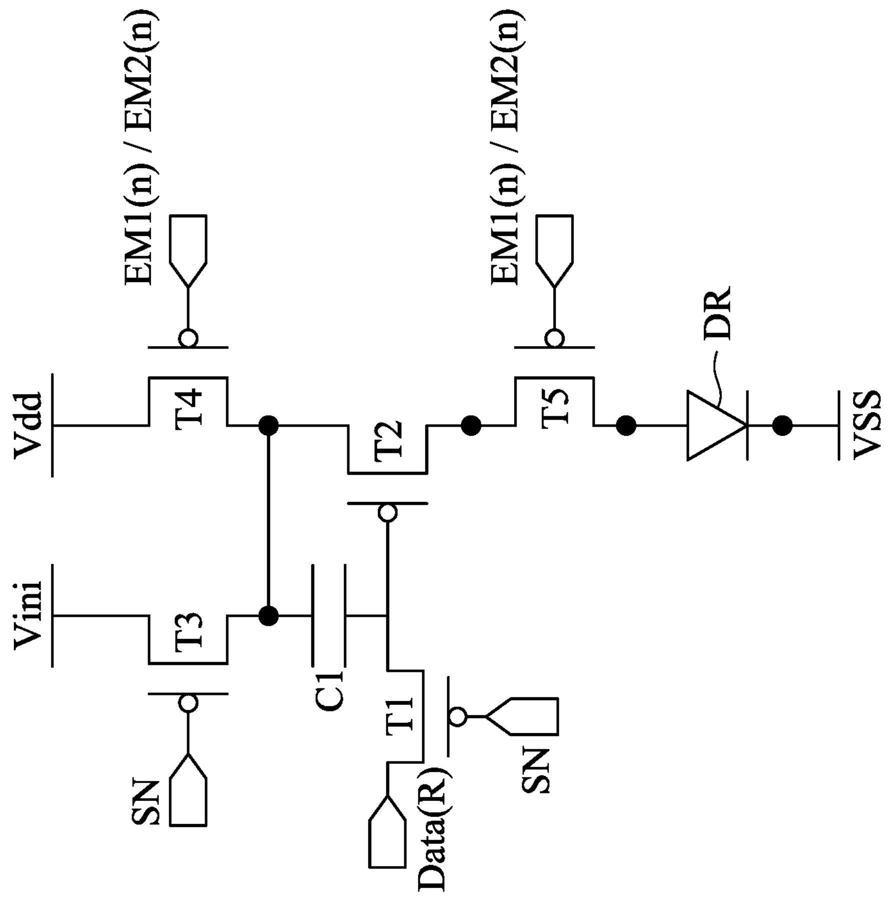
FIG. 9 is a schematic diagram showing an exemplary circuit structure of the first color pixel circuit in accordance with embodiments of the present invention.
Figure 10:
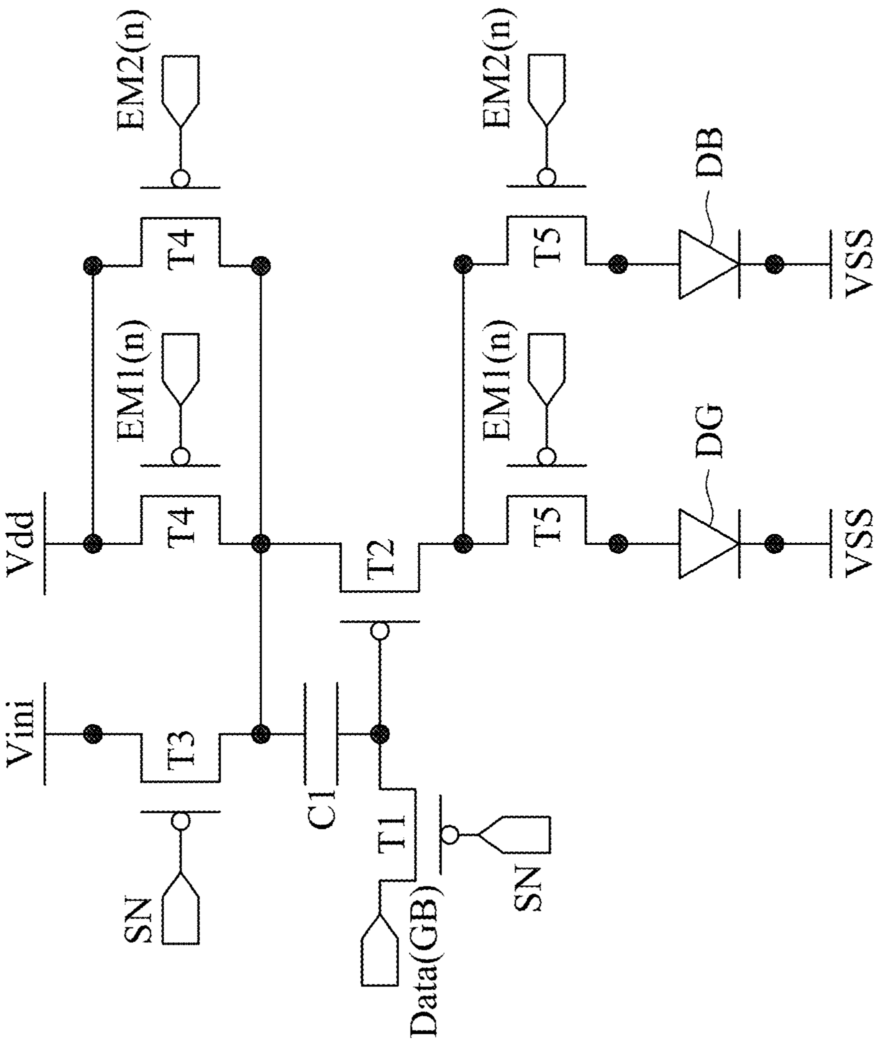
FIG. 10 is a schematic diagram showing an exemplary circuit structure of the second color pixel circuit/third color pixel circuit in accordance with embodiments of the present invention.

Referring to FIG. 9 and FIG. 10, FIG. 9 is a schematic diagram showing an exemplary circuit structure of the first color pixel circuit in accordance with embodiments of the present invention, FIG. 10 is a schematic diagram showing an exemplary circuit structure of the second color pixel circuit/third color pixel circuit in accordance with embodiments of the present invention, in which the nth scan line is taken as an example for illustration. As shown in FIG. 9, the first color pixel circuit of the present embodiments includes transistors T1-T5 and a capacitor C1, in which voltage signals Vini and Vdd are used to provide power voltages, and a ground signal Vss is used to provide a grounding reference voltage. The transistor T1 is configured to receive the pixel data signals Data(R), the transistors T1, T3, T4 and T5 are controlled by the signal SN and the signals of the scan lines EM1(*n*)/EM2(*n*), thereby driving first color light-emitting diode DR. As shown in FIG. 10, the second color pixel circuit and the third color pixel circuit are integrated to drive the second color light-emitting diode DG and the third color light-emitting diode DB. Specifically, the integration circuit is similar to the first color pixel circuit shown in FIG. 9, but the difference is in that the integration circuit further includes two transistors T4 and two transistors T5 to receive the scan line signals, for example the scan line signals of the scan lines EM1(*n*) and EM2(*n*).

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device, comprising:

a first pixel row comprising a plurality of first pixel blocks, wherein each of the first pixel blocks comprises:

a first color sub-pixel block electrically connected to a first scan line, a second scan line and a first data line to obtain a first color data from the first data line in accordance with a signal of the first scan line;

a second color sub-pixel block electrically connected to the second scan line and a second data line to obtain a second color data from the second data line in accordance with a signal of the second scan line; and a third color sub-pixel block electrically connected to the first scan line and the second data line to obtain a third color data from the second data line in accordance with a signal of the first scan line; and a second pixel row disposed adjacent to the first pixel row, wherein the second pixel row comprises a plurality of second pixel blocks, and each of the second pixel blocks comprises:

a fourth color sub-pixel block electrically connected to a third scan line, a fourth scan line and the first data line to obtain a fourth color data from the first data line in accordance with a signal of the third scan line;

a fifth color sub-pixel block electrically connected to the fourth scan line and the second data line to obtain a sixth color data from the second data line in accordance with a signal of the fourth scan line; and a sixth color sub-pixel block electrically connected to the third scan line and the second data line to obtain a sixth color data from the second data line in accordance with a signal of the third scan line;

wherein the first color sub-pixel block and the second color sub-pixel block correspond to a first sub-frame of a frame, and the first color sub-pixel block and the third color sub-pixel block correspond to a second sub-frame of the frame;

wherein the fourth color sub-pixel block and the fifth color sub-pixel block correspond to the first sub-frame of the frame, and the fourth color sub-pixel block and the sixth color sub-pixel block correspond to the second sub-frame of the frame;

wherein the first color sub-pixel block and the fourth color sub-pixel block correspond to a red color, the second color sub-pixel block and the fifth color sub-pixel block correspond to a green color, and the third color sub-pixel block and the sixth color sub-pixel block correspond to a blue color.

2. The display device of the claim 1, wherein the first color sub-pixel block is located between the first data line and the second data line.

3. The display device of the claim 1, wherein the fourth color sub-pixel block is located between the first data line and the second data line.

4. A display device, comprising:

a first pixel row comprising a plurality of first pixel blocks, wherein each of the first pixel blocks comprises:

a first color sub-pixel block electrically connected to a first scan line, and a first data line to obtain a first color data from the first data line in accordance with a signal of the first scan line;

a second color sub-pixel block electrically connected to a second scan line and a second data line to obtain a second color data from the second data line in accordance with a signal of the second scan line; and a third color sub-pixel block electrically connected to the first scan line and the second data line to obtain a third color data from the second data line in accordance with a signal of the first scan line; and a second pixel row disposed adjacent to the first pixel row, wherein the second pixel row comprises a plurality of second pixel blocks, and each of the second pixel blocks comprises:

a fourth color sub-pixel block electrically connected to a third scan line and the first data line to obtain a fourth color data from the first data line in accordance with a signal of the third scan line;

a fifth color sub-pixel block electrically connected to a fourth scan line and the second data line to obtain a fifth color data from the second data line in accordance with a signal of the fourth scan line; and a sixth color sub-pixel block electrically connected to the third scan line and the second data line to obtain a sixth color data from the second data line in accordance with a signal of the third scan line;

wherein the first color sub-pixel block and the third color sub-pixel block of a first one of the first pixel blocks correspond to a first sub-frame of a frame, and the second color sub-pixel block of a second one of the first pixel blocks correspond to a second sub-frame of the frame, and the second one of the first pixel blocks is adjacent to the first one of the first pixel blocks;

wherein the fifth color sub-pixel block corresponds to the first sub-frame of the frame, and the fourth color sub-pixel block and the sixth color sub-pixel block correspond to the second sub-frame of the frame;

wherein the first color sub-pixel block and the fourth color sub-pixel block correspond to a red color, the second color sub-pixel block and the fifth color sub-pixel block correspond to a green color, and the third color sub-pixel block and the sixth color sub-pixel block correspond to a blue color.

5. The display device of the claim 4, wherein the first color sub-pixel block is located between the first data line and the second data line.

6. The display device of the claim 4, wherein the fourth color sub-pixel block is located between the first data line and the second data line.

7. A control method of a display device, comprising:

providing a first pixel row comprising a plurality of first pixel blocks, wherein each of the first pixel blocks comprises: a first color sub-pixel block, a second color sub-pixel block and a third color sub-pixel block;

dividing a frame into a first sub-frame and a second sub-frame;

defining M first color mixed pixel blocks and N first single color pixel blocks in the first pixel blocks, wherein M is an integer greater than 1, and N is an integer greater or equal to 0;

when N=0, performing a first pixel control step to control the first color sub-pixel block and the second color sub-pixel block of at least one of the first color mixed pixel blocks to emit light in the first sub-frame, and to control the first color sub-pixel block and the third color sub-pixel block of the at least one of the first color mixed pixel blocks to emit light in the second sub-frame; and when N=0, performing a second pixel control step, wherein the second pixel control step comprises:

controlling the first color sub-pixel block and the third color sub-pixel block of each of the first color mixed pixel blocks to emit light in the first sub-frame; and controlling the second color sub-pixel block of each of the single color pixel blocks to emit light in the first sub-frame.

8. The control method of claim 7, further comprising:

providing a second pixel row adjacent to the first pixel row, wherein the second pixel row comprises a plurality of second pixel blocks, and each of the second pixel blocks comprises a fourth color sub-pixel block, a fifth color sub-pixel block and a sixth color sub-pixel block;

defining X second color mixed pixel blocks and Y second single color pixel blocks in the second pixel blocks, wherein X is an integer greater than 1, and Y is an integer greater or equal to 0;

when Y=0, performing a third pixel control step to control the first color sub-pixel block and the third color sub-pixel block of at least one of the second color mixed pixel blocks to emit light in the first sub-frame, and to control the first color sub-pixel block and the second color sub-pixel block of the at least one of the second color mixed pixel blocks to emit light in the second sub-frame; and when Y=0, performing a fourth pixel control step, wherein the fourth pixel control step comprises:

controlling the first color sub-pixel block and the third color sub-pixel block of each of the second color mixed pixel blocks to emit light in the first sub-frame; and controlling the second color sub-pixel block of each of the single color pixel blocks to emit light in the first sub-frame.

9. The control method of claim 8, wherein the first color sub-pixel block and the fourth color sub-pixel block correspond to a red color, the second color sub-pixel block and the fifth color sub-pixel block correspond to a green color, and the third color sub-pixel block and the sixth color sub-pixel block correspond to a blue color.

10. The control method of claim 8, wherein when M and N are greater than or equal to 2, the first single color pixel blocks and the first color mixed pixel blocks are alternatively arranged; and when X and Y are greater than or equal to 2, the second single color pixel blocks and the second color mixed pixel blocks are alternatively arranged.

11. The control method of claim 8, wherein providing the first pixel row comprises:

disposing the first color sub-pixel block between a first data line and a second data line.

12. The control method of claim 8, wherein providing the second pixel row comprises:

disposing the fourth color sub-pixel block between a first data line and a second data line.

* * * * *